United States Patent
Dobre et al.

(10) Patent No.: US 9,753,792 B2
(45) Date of Patent: Sep. 5, 2017

(54) METHOD AND SYSTEM FOR BYZANTINE FAULT TOLERANT DATA REPLICATION

(71) Applicant: NEC EUROPE LTD., Heidelberg (DE)

(72) Inventors: Dan Dobre, Munich (DE); Ghassan Karame, Heidelberg (DE); Marko Vukolic, Zurich (CH)

(73) Assignee: NEC EUROPE LTD., Heidelberg (DE)

( * ) Notice: Subject to any disclaimer, the term of this patent is extended or adjusted under 35 U.S.C. 154(b) by 0 days.

(21) Appl. No.: 14/778,084

(22) PCT Filed: Mar. 18, 2014

(86) PCT No.: PCT/EP2014/055436
§ 371 (c)(1),
(2) Date: Sep. 18, 2015

(87) PCT Pub. No.: WO2014/147085
PCT Pub. Date: Sep. 25, 2014

(65) Prior Publication Data
US 2016/0283123 A1 Sep. 29, 2016

(30) Foreign Application Priority Data
Mar. 20, 2013 (EP) .................................... 13160155

(51) Int. Cl.
*G06F 11/00* (2006.01)
*G06F 11/07* (2006.01)
(Continued)

(52) U.S. Cl.
CPC .......... *G06F 11/0709* (2013.01); *G06F 3/065* (2013.01); *G06F 3/067* (2013.01);
(Continued)

(58) Field of Classification Search
CPC .. G06F 11/0709; G06F 11/0727; G06F 11/10; G06F 11/08; G06F 11/1612;
(Continued)

(56) References Cited

U.S. PATENT DOCUMENTS

| 6,535,868 B1* | 3/2003 | Galeazzi ........... G06F 17/30371 |
| 2003/0078946 A1* | 4/2003 | Costello ............. G06F 11/2064 |

(Continued)

OTHER PUBLICATIONS

Liskov B et al: "Tolerating Byzantine Faulty Clients in a Quorum System", Distributed Computing Systems, 2006. ICDCS 2006. 26th International AL Conference on Lisboa, Portugal Jul. 4-7, 2006; Jul. 4, 2006 (Jul. 4, 2006), p. 34, XP010927339.

Eduardo A P Alchieri et al: "Proactive Byzantine Quorum Systems", Nov. 1, 2009 (Nov. 1, 2009), On the Move to Meaningful Internet Systems: OTM 2009, Springer Berlin Heidelberg, Berlin, pp. 708-725, XP019133426.

*Primary Examiner* — Joseph D Manoskey
(74) *Attorney, Agent, or Firm* — Leydig, Voit & Mayer, Ltd.

(57) ABSTRACT

A method for byzantine fault tolerant data replication with a plurality of 2f+1 data servers and one or more clients includes storing data in at least f+1 different data servers out of the 2f+1 data servers, and storing metadata of the stored data under a metadata-identifier in a metadata-service (MDS). The stored metadata includes a unique identifier of the stored data, a fingerprint of the stored data, and a list of the at least f+1 different data servers which have stored the data.

13 Claims, 3 Drawing Sheets

(51) Int. Cl.
*G06F 11/14* (2006.01)
*G06F 11/20* (2006.01)
*G06F 3/06* (2006.01)

(52) U.S. Cl.
CPC ........ *G06F 3/0619* (2013.01); *G06F 11/1443* (2013.01); *G06F 11/2094* (2013.01); *G06F 2201/83* (2013.01)

(58) Field of Classification Search
CPC ............ G06F 11/2017; G06F 11/2056; G06F 11/2058; G06F 11/2053; G06F 3/065; G06F 3/0619; G06F 3/067; G06F 11/1443; G06F 11/2094; G06F 2201/83
USPC ......... 714/4.1, 4.11, 6.1, 6.2, 6.3, 27, 42, 43
See application file for complete search history.

(56) References Cited

U.S. PATENT DOCUMENTS

| | | | |
|---|---|---|---|
| 2006/0161518 A1* | 7/2006 | Lacapra | H04L 61/1576 |
| 2010/0017644 A1* | 1/2010 | Butterworth | G06F 11/1658 |
| | | | 714/4.1 |
| 2010/0161657 A1* | 6/2010 | Cha | G06F 17/30094 |
| | | | 707/770 |
| 2013/0290295 A1* | 10/2013 | Soules | G06F 17/30283 |
| | | | 707/714 |

* cited by examiner

METHOD AND SYSTEM FOR BYZANTINE FAULT TOLERANT DATA REPLICATION

CROSS REFERENCE TO RELATED APPLICATIONS

This application is a U.S. National Stage Application under 35 U.S.C. §371 of International Application No. PCT/EP2014/055436 filed on Mar. 18, 2014, and claims benefit to European Patent Application No. 13160155.1 filed on Mar. 20, 2013. The International Application was published in English on Sep. 25, 2014 as WO 2014/147085 A2 under PCT Article 21(2).

FIELD

The present invention relates to a method for a byzantine fault tolerant data replication with a plurality of 2f+1 data servers and one or more clients.

BACKGROUND

Data replication provides in general availability and data durability in the presence of failures. For example a replicated data store features strong consistency if it displays a behavior of a non-replicated data store in which operations are executed sequentially. However, performance and scalability are major problems.

With the increasing complexity of data-serving systems and an increased criticality of the stored data byzantine-fault tolerance was established as an alternative to crash-fault tolerance since a large spectrum of issues including simple outages, software-bugs, misconfigurations and even intrusions and malware can be masked and grouped together under the term "arbitrary failure" respectively "byzantine failure".

To implement a robust replicated data store, i.e. guaranteeing correctness under arbitrary failures, in the presence of asynchrony, concurrency and failures, quorum based replication is used. In the non-patent literature of Jean-Philippe Martin, Lorenzo Alvisi, Michael Dahlin: Minimal Byzantine Storage, DISC 2002: 311-325, it is shown that 3f+1 servers have to be used for byzantine-fault tolerance of f arbitrary failures. To read a correct value, a quorum Qr, i.e. a set of servers Qr, queried by a read operation needs to intersect a quorum Qw updated by a write operation in f+1 servers. That could guarantee that there is at least one correct server in the intersection, since at most f may be fail Byzantine. This translates to the following requirement:

$$|Qr|+|Qw|-n>=f+1 \quad (1)$$

wherein n is the total number of servers to be used.

Furthermore, to avoid indefinitely waiting for crashed servers during a read or a write operation the quorums of servers, Qr and Qw can comprise of at most n-f servers. Since at most f servers may be faulty, n-f servers are guaranteed to eventually reply. This translates to the following requirement:

$$|Qr|=|Qw|<=n-f \quad (2)$$

By combining the two requirements (1) and (2) this leads to:

$$2n-2f-n>=f+1=>n>=3f+1$$

Therefore conventional systems use 3f+1 servers on byzantine fault-tolerant storage.

For example, in the non-patent literature of Alysson Neves Bessani, Miguel P. Correia, Bruno Quaresma, Fernando André, Paulo Sousa: DepSky: dependable and secure storage in a cloud-of-clouds. EuroSys 2011: 31-46, 3f+1 servers or clouds are used to tolerate the failure up to f servers using byzantine quorum-based data replication.

In the further non-patent literature of Miguel Castro, Barbara Liskov: Practical byzantine fault tolerance and proactive recovery. ACM Trans. Comput. Syst. 20(4): 398-461 (2002) and Dahlia Malkhi, Michael K. Reiter: Byzantine Quorum Systems. Distributed Computing 11(4): 203-213 (1998) other conventional byzantine fault tolerance systems are shown.

SUMMARY

In an embodiment, the present invention provides a method for byzantine fault tolerant data replication with a plurality of 2f+1 data servers and one or more clients. The method includes storing data in at least f+1 different data servers of the 2f+1 data servers, and storing metadata of the stored data under a metadata-identifier in a metadata-service (MDS).

The stored metadata include a unique identifier of the stored data, a fingerprint of the stored data, and a list of the at least f+1 different data servers which have stored the data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
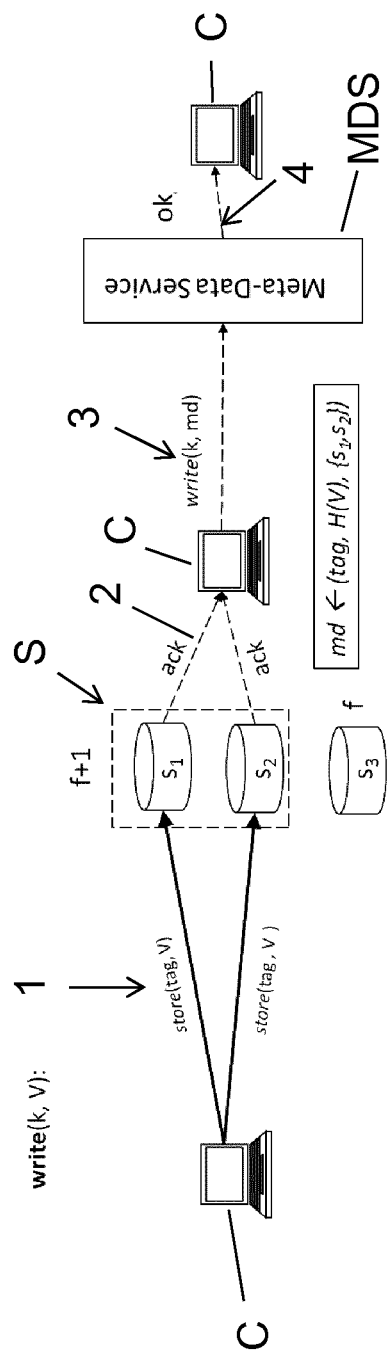
FIG. 1 shows schematically steps of a method according to a first embodiment of the present invention.

Since tolerating Byzantine faults requires f servers more than needed to tolerate only crash failures, one of the problems of byzantine quorum-based data replication are the additional costs compared to crash tolerant systems. For example as shown in the non-patent literature of Rui Fan, Nancy A. Lynch: Efficient Replication of Large Data Objects. DISC 2003: 75-91, 2f+1 servers are used to tolerate f crashes, yet no byzantine faults can be tolerated.

In an embodiment, the present invention provides a method and a system for a byzantine fault tolerant data replication which have improved efficiency, in particular in terms of storage server acquisition costs and maintenance costs as well as in terms of storage space.

In an embodiment, the present invention provides a method for byzantine fault-tolerant data replication with less than 3f+1 data servers.

In an embodiment, the invention provides a method and a system for byzantine fault tolerant data replication which have improved read performance and have a linear read scalability in terms of the number of storage servers.

In an embodiment, the present invention provides a method and a system for byzantine fault tolerant data replication, enabling transactional data access.

In an embodiment, data is stored in at least f+1 different data servers out of the 2f+1 data servers and that metadata of the stored data is stored under a metadata-identifier in a, preferably fault-tolerant, metadata-service, wherein the metadata to be stored includes a unique identifier of the stored data, a fingerprint of the stored data and a list of data servers which have stored the data.

In an embodiment, the invention provides a system in which at least f+1 different data servers out of the 2f+1 data servers are each operable to store data and a, preferably fault-tolerant, metadata-service for storing metadata of the stored data operable to store the metadata under a metadata-identifier, wherein the metadata to be stored includes a unique identifier of the stored data, a fingerprint of the stored data and a list of data servers which have stored the data.

The term "fingerprint" can be understood herein to mean, for example, a characteristic well defined string for identification including in particular a cryptographic hash.

A metadata service can be leveraged together with a set of 2f+1 data servers of which f may occur arbitrary failures. While the data servers store the actual data, the metadata service keeps track of associated metadata including but not limited to, for example, the location of the data copies, the fingerprints (for example cryptographic hashes of the data for integrity verification), or the like.

Efficiency is significantly enhanced and the replication costs are reduced in particular when relying on the assumption that data objects are large relative to metadata and thus the cost of data operations represents the dominant costs in terms of bandwidth and latency. As a consequence metadata accesses are significantly cheaper than data accesses provided the metadata services designed correspondingly.

In an embodiment of the invention, scalability is provided and correctness, wait-freedom, and linearizability of replicated data, respectively the metadata service, is enabled.

According to an embodiment, the metadata is only stored upon successful storing of the data on the f+1 data servers. This enhances the reliability since only upon successfully storing on all of the f+1 data servers the metadata is stored. The list of f+1 data servers can then be provided in an easy way for the metadata service.

According to a further embodiment for reading data by a client a data server of the list of data servers is queried with the unique identifier of the data, based on metadata provided by the metadata service upon querying with a metadata identifier, the stored data according to the unique identifier is provided and upon matching of the fingerprints of the stored data and of the stored metadata the stored data is provided to the client.

For reading data the metadata service is therefore queried returning the queried value together for example with a tag for the data, a cryptographic digest of the stored data and a list of servers. The querying client then may retrieve the corresponding data by the tag from one of the servers of the list. If the returned value matches the digest, then the read operation returns the correct value and the read operation is completed. Therefore a fast and easy as well as reliable read operation is provided.

According to a further embodiment in case of a mismatch of the fingerprints steps are repeated with one or more other data servers of the list of data servers until at least one matching is achieved. This ensures that in case of a Byzantine or crash failure off data servers of the list, the client can nevertheless obtain a correct value of the stored data from one correct data server. Therefore the reliability of reading of data is further enhanced.

According to a further embodiment repeating of the steps is performed sequentially with one data server of the list of data servers only per repetition. This enables that only one server is queried for providing the data and the other servers out of the list are not blocked for other write operations for example. The other servers are only queried in case the current queried server does not provide the correct fingerprint and subsequently the correct data.

According to a further embodiment version information of the data is stored in the metadata service and provided to the client upon querying. If version information is stored then transactions are enabled. For example operations can be supported beyond basic overwrites including for example conditional updates or conditional multi-updates when the metadata service offers corresponding operations.

According to a further embodiment the metadata service is provided as a cloud service. This enables in an easy way to lower the costs for providing a metadata service, i.e. maintenance costs, or the like. Further cloud data is usually provided in a fault tolerant way, therefore reliability is further enhanced.

According to a further embodiment at least two of the data servers provide different file storage services for storing data, preferably at least two of the f+1 data servers. By using different file storage services, for example different databases, security and reliability are enhanced, since for example data can be read even in case that one of the storage services is offline or being attacked or hacked.

According to a further embodiment for storing a plurality of data simultaneously, each data is stored on each of the f+1 data servers. This enables in an easy way to provide advanced operations like multi-update etc. further enhancing the flexibility.

According to a further embodiment the metadata service uses a quorum-based protocol for fault-tolerance. This enables robustness against failures and enables an easy implementation.

According to a further embodiment the metadata service linearizes operations on the metadata. This enables for example read and/or write operations to be executed to an execution order of (low-level) read and write operations on the metadata. Therefore the real-time order of operations on metadata can be respected.

Figure 2:
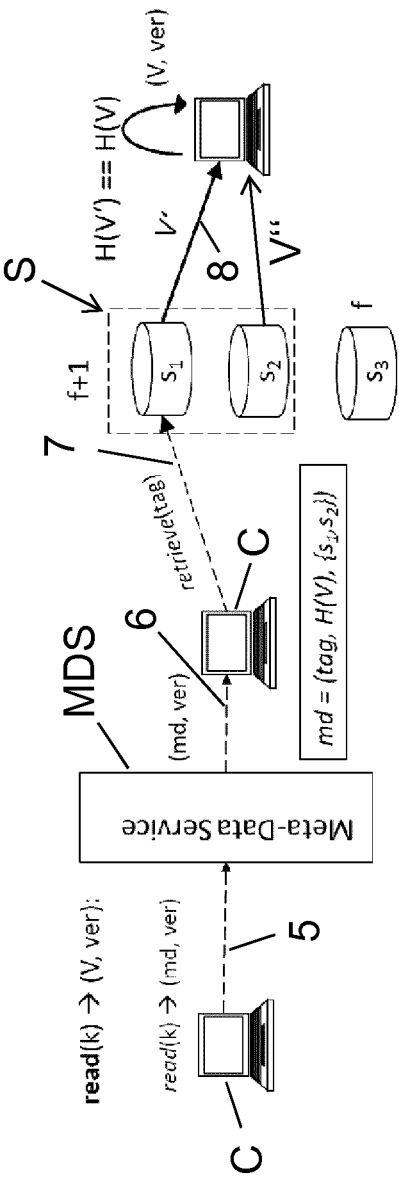
FIG. 2 shows schematically steps of a method according to a second embodiment of the present invention.
Figure 3:
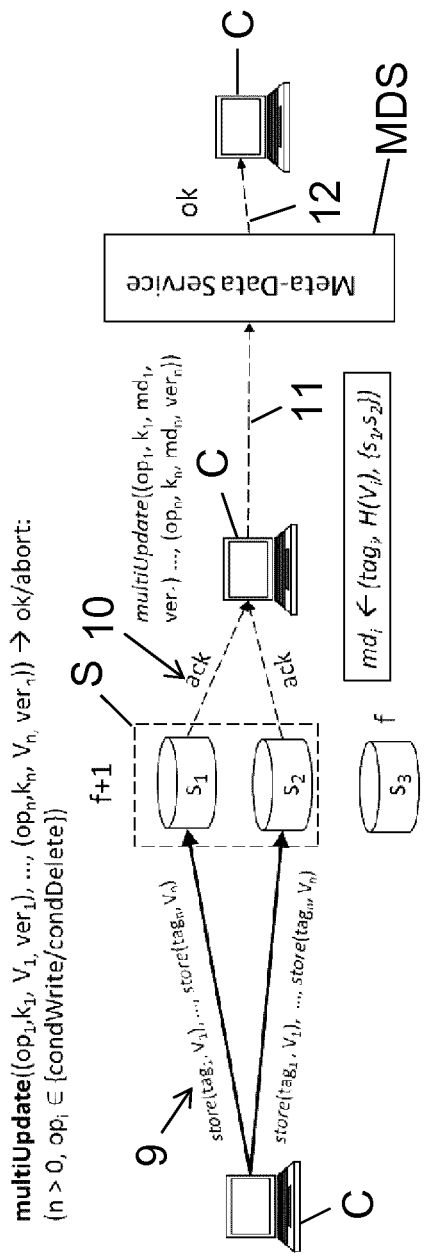
FIG. 3 shows schematically steps of a method according to a third embodiment of the present invention.

For the FIG. 1-3 a distributed system comprising a set of data servers S={$s_1, s_2, \ldots, s_S$} and a set of clients C={$c_1, \ldots, c_C$} is assumed. Up to a minority of the data servers byzantine failures may incur (|S|≥2f+1, where f is the failure threshold). Further any number of clients may fail by crashing. Furthermore a non-faulty metadata service offering support for reading and updating metadata is assumed. Further H indicates a collision-resistant cryptographic hash function and operations on metadata are linearized by the metadata service MDS.

FIG. 1 shows schematically steps of a method according to a first embodiment of the present invention.

In FIG. 1 the case is showing for f=1, i.e. the number of servers for which a byzantine failure may occur and |S|=3, i.e. the number of data servers specifically in FIG. 1 a write operation for updating a data object k having a value V is shown. A client C initiates in a first step 1 a storing of the value V on the servers $s_1$ and $s_2$ together with a corresponding tag. Upon successfully storing the data each of the f+1 servers S, i.e. $s_1$ and $s_2$ send in a second step 2 an acknowledgement message to the client C.

The client C then subsequently computes a digest of the stored value V using a cryptographic hash function H(V) and invokes then in a third step 3 the metadata service MDS supplying as metadata md the key k and a value comprising the tag, the digest and the list of data servers, i.e. $s_1$ and $s_2$. Further, client C may also supply a version information for the value V, for example in case of a conditional update, cf. FIG. 3.

Writing a copy of the value into the f+1 servers, in FIGS. 1 $s_1$ and $s_2$, ensures that a subsequent read can retrieve the value V even if f servers, in FIG. 1 either server $s_1$ or $s_2$, fail after being updated by the write operation. The additional f data servers in FIG. 1 the server $s_3$, are used to prevent the write operation from blocking while trying to update f+1 servers $s_1$, $s_2$ in the present of f faulty servers. In the optimal case f respectively f+1 representing lower bounds for any data replication protocol including crash-tolerant ones.

In a fourth step 4 the metadata service MDS provides a corresponding acknowledgement message to the client C indicating that also the metadata was stored successfully in the metadata service MDS.

FIG. 2 shows schematically steps of a method according to a second embodiment of the present invention.

In FIG. 2 a read operation for reading a value for a key k is shown. The client C contacts in a first step 5 the metadata service MDS by querying it with the key k. The metadata service MDS then returns the metadata md and—if transactions are supported—version information ver to the client C in a second step 6. The client C then retrieves the corresponding data by tag from one of the servers $s_1$, $s_2$ in the list included in the metadata md in a seventh step 7. The contacted server, i.e. in FIG. 2 the server $s_1$, then provides the value V' corresponding to the tag and stored under this tag on the server $s_1$ in a further step 8 back to the client C. The client C then compares if the returned value V' matches the digest, i.e. the client C computes the fingerprint H(V') of the value V' and compares it with the obtained metadata md which includes the stored fingerprint H(V) of the value V. Therefore if the returned value V' matches the digest, i.e. H(V)=H(V') then the read operation returns the value V' as correct value V and the operation is completed.

Otherwise the client C iterates through the list of servers, in FIG. 2 the servers $s_1$ and $s_2$, until some of the servers $s_1$, $s_2$ reply with a matching value. For example if the value V' does match the digest then the client C queries the second server $s_2$ out of the list of the f+1 servers $s_1$, $s_2$ with the tag and the server $s_2$ then replies with the value V'''; the client C then compares again the digest included in the metadata md and the fingerprint H(V) of the returned value V'''; upon matching, i.e. H(V)=H(V''') the read operation is completed.

FIG. 3 shows schematically steps of a method according to a third embodiment of the present invention.

In FIG. 3 steps of a multi-update operation is shown. The multi-update operation enables to perform update operations to different keys atomically in an all or nothing fashion.

In FIG. 3 the client C stores a plurality of values $V_1, \ldots, V_n$ with the corresponding tags $tag_1, \ldots, tag_n$ on each of the f+1 servers $s_1$, $s_2$. Upon receiving an acknowledgement message from the servers $s_1$, $s_2$ storing the values $V_1$, V, the client C computes the metadata md; for each of the values: $md_i = (tag_i, H(V_i), \{s_1, s_2\})$ and contacts in a further step 11 the metadata service MDS for storing an operation identifier $op_i$, and the corresponding key $k_i$, metadata $md_i$, and version data $ver_i$, for all indices 1..., n of the values $V_1, \ldots V_n$. Upon successfully storing this information, the metadata service MDS provides in a further step 12 the corresponding acknowledgement message back to the client C.

For example the corresponding operation $op_i$, may include a conditional write or a conditional delete operation or the like. For a conditional write, corresponding version information $ver_i$ are included in the metadata $md_i$ or stored in the metadata service MDS linked with the corresponding metadata $md_i$ for the stored data. Then with regard to FIG. 1 the values are stored in a write operation atomically. If some version $ver_i$ does not match the respective current version of the data, no modification occurs to any of the data object, i.e. of the values $V_i$ and for example an error information may be returned.

In case of a conditional update, a value V is stored under the key k only if the supplied version matches the current version of the data and otherwise no modification occurs and error information may be returned to the client C. A conditional delete operation deletes a key k only if the supplied version matches the current version of the value of the data. Otherwise no modification occurs and an error information may be returned. A delete operation may be implemented by write operation the writing value {null} as value for deletion.

The method and system of byzantine fault-tolerant data replication is correct: To proof the correctness in the following it is described that the operations according to the invention are wait-freedom and linearizable. Wait-freedom means, that operations by correct clients are always complete regardless of the behavior of other clients. According to the invention wait-freedom is insured provided that the metadata service exports wait-free operations and that no more than f data servers are faulty. Further linearizability also known as atomicity means that operations appear to take effect instantaneously at a single instant in time between their invocation and response steps. According to the invention linearizablity is achieved provided that the metadata operations are linearizable wherein linearizability is independent of number of servers f being faulty.

When assuming that low-level operations invoked on the metadata service MDS are wait-free it has to be shown that no operation blocks when accessing one of the data servers. Since at most f data servers are faulty, each update operation eventually receives a reply from f+1 correct servers. Therefore no update operation blocks while awaiting replies from the data servers. When performing an update operation the metadata is only written after storing the corresponding data on the data servers and by the time the reader obtains the metadata the corresponding update operation has stored a matching value in every of the f+1 servers under the corresponding tag. Since among these servers at most f are byzantine faulty, there is at least one correct server of these f+1 servers that stores a matching value V under the corresponding tag and eventually replies to the reader, i.e. the client. After checking that H(V) is matching the digest, the read operation is completed. While in asynchronies runs with failures which is the worst case, a read may need to query f+1 data servers before receiving a matching reply in failure-free and synchronous runs which is the common case, just one data server is queried by a read.

The metadata service MDS as mentioned above linearizes all operations on the metadata. Specifically the read and write operation are linearized according to the execution order of the corresponding low-level write and read operations on the metadata. With the linearizability of the metadata operations the history of low-level operations satisfies a sequential specification of the metadata service MDS and respects the real-time order of metadata operations. Since the sequential specification of the metadata service is equivalent to that of the overall system and the metadata service maintains the real-time precedence relation between high level operations can be concluded that high level operations are linearizable.

In summary the present invention enables a decoupling of the metadata from data in the byzantine context in order to reduce the number of data servers from 3f+1 to 2f+1. The present invention further leverages a metadata service together with a set of 2f+1 data servers to implement strongly consistent data replication. The present invention further enables querying just one data-server in the common case when the metadata service is consulted before querying the data servers. Even further the present invention enables export of data operations provided that an equivalent metadata operation is exposed by the metadata service.

The present invention has inter alia the following advantages: The present invention provides savings and terms of storage server acquisition costs and maintenance costs as well as in terms of storage space. The present invention further improves read performance and read scalability linear in the number of storage servers and enables transactional data access. Even further the present invention enables a substantial reduction of replication costs from 3f+1 servers to just 2f+1 data servers and read scalability as mentioned above: As only a single data server is typically accessed during a read operation, the load incurred by each server is 1/|S|, provided that the data objects to be stored are evenly spread across servers, resulting in a capacity of |S|, i.e. the number of data servers.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for byzantine fault tolerant data replication with a plurality of 2f+1 data servers and one or more clients, the method comprising:
   storing data in at least f+1 different data servers of the 2f+1 data servers;
   storing metadata of the stored data under a metadata-identifier in a metadata-service (MDS), wherein the stored metadata includes a unique identifier of the stored data, a fingerprint of the stored data, and a list of the at least f+1 different data servers which have stored the data; and
   reading the stored data by, a first one of the one or more clients by:
   (a) querying a first data server of the list of the at least f+1 different data servers with the unique identifier of the data based on the stored metadata provided by the MDSupon being queried with the metadata-identifier,
   (b) providing the stored data according to the unique identifier; and
   (c) providing the stored data to the first client based on a match of the fingerprints of the stored data and of the stored metadata.

2. The method according to claim 1, wherein the metadata is only stored upon successful storing of the data on the at least f+1 different data servers.

3. The method according to claim 1, further comprising:
   repeating (a)-(c) based on a mismatch of the fingerprints with one or more other data servers of the list of the at least f+1 different data servers until at least one match is achieved.

4. The method according to claim 3, wherein the repeating steps (a)-(c) is performed sequentially with only one of the other data servers of the list of the at least f+1, different data servers per repetition.

5. The method according to claim 1, wherein version information of the stored data is stored in the MDS and provided to the one or more clients upon querying.

6. The method according to claim 1, wherein the MDS is provided as a cloud service.

7. The method according to claim 1, wherein at least two of the plurality of 2f+1 data servers provide different file storage services for storing the data.

8. The method according to claim 1, further comprising storing a plurality of data units simultaneously by storing each data unit on each of the f+1 different data servers.

9. The method according to claim 1, wherein the MDS uses a quorum-based protocol for fault-tolerance.

10. The method according to claim 1, wherein the metadata service MDS linearizes operations on the metadata.

11. The method according to claim 1, wherein the MDS is a fault-tolerant MDS.

12. The method according to claim 1, wherein at least two of the at least f+1 different data servers provide different file storage services for storing the data.

13. A system for byzantine fault tolerant data replication with a plurality of 2f+1 data servers and one or more clients, the system comprising:
   at least f+1 different data servers of the 2f+1 data servers each being operable to store data;
   a fault-tolerant metadata-service (MDS) being operable to store metadata of the stored data under a metadata-identifier, wherein the metadata includes a unique identifier of the stored data, a fingerprint of the stored data and a list of data servers which have stored the data, and
   a first on of the one or more clients being operable to read the stored data by:
   (a) querying a first data server of the list of the at least f+1 different data servers with the unique identifier of the data based on the stored metadata provided by the MDS upon being queried with the metadata-identifier,
   (b) providing the stored data according to the unique identifier; and (c) providing the stored data to the first client based on a match of the fingerprints of the stored data and of the stored metadata.

\* \* \* \* \*